(12) United States Patent
Hayakawa et al.

(10) Patent No.: US 11,305,757 B2
(45) Date of Patent: Apr. 19, 2022

(54) VEHICLE TRAVEL CONTROL METHOD AND VEHICLE TRAVEL CONTROL DEVICE

(71) Applicants: Nissan Motor Co., Ltd., Yokohama (JP); Renault S.A.S., Boulogne-Billancourt (FR)

(72) Inventors: Yasuhisa Hayakawa, Kanagawa (JP); Yasuhiro Sakurai, Kanagawa (JP); Yasuhiro Suzuki, Kanagawa (JP); Junichi Kuwabara, Kanagawa (JP)

(73) Assignees: Nissan Motor Co., Ltd., Yokohama (JP); Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/311,140

(22) PCT Filed: Dec. 11, 2018

(86) PCT No.: PCT/IB2018/001584
§ 371 (c)(1),
(2) Date: Jun. 4, 2021

(87) PCT Pub. No.: WO2020/121012
PCT Pub. Date: Jun. 18, 2020

(65) Prior Publication Data
US 2022/0024449 A1 Jan. 27, 2022

(51) Int. Cl.
*B60W 30/06* (2006.01)
*E05B 77/00* (2014.01)
(Continued)

(52) U.S. Cl.
CPC ........... *B60W 30/06* (2013.01); *B60R 25/245* (2013.01); *B60W 60/0025* (2020.02);
(Continued)

(58) Field of Classification Search
CPC . B60R 25/245; B60W 30/06; B60W 60/0025; B60W 2520/06; B60W 2520/10;
(Continued)

(56) References Cited

U.S. PATENT DOCUMENTS 10,137,858 B2  11/2018  Sakamoto
2012/0316704 A1* 12/2012  Ohbayashi .............. B60R 25/04
                                                                701/2
(Continued)

FOREIGN PATENT DOCUMENTS

CN   104057950 A   9/2014
CN   104837689 A   8/2015
(Continued)

*Primary Examiner* — Anshul Sood
(74) *Attorney, Agent, or Firm* — Young Basile Hanlon & MacFarlane, P.C.

(57) ABSTRACT

A method performs autonomous travel control of a subject vehicle to a target stop position on the basis of a remote operation command from a remote operation device. The subject vehicle has an autonomous travel control function and an automatic locking/unlocking function for a vehicle door. The autonomous travel control is executed under a precondition that a locking/unlocking device for the door is unlocked. The method includes prohibiting the automatic locking/unlocking function from locking the door while the vehicle is executing autonomous travel control; detecting a distance between the vehicle and the remote operation device when the vehicle stops at the target stop; setting a temporal interval from when the vehicle stops until the locking/unlocking device for the door is locked using the automatic locking/unlocking function to a temporal interval in accordance with the distance; and locking the door using the automatic locking/unlocking function when the temporal interval has elapsed.

7 Claims, 18 Drawing Sheets

(51) Int. Cl.
*G05D 1/00* (2006.01)
*B60R 25/24* (2013.01)
*B60W 60/00* (2020.01)
*E05B 77/54* (2014.01)
*E05B 83/36* (2014.01)
*E05B 81/58* (2014.01)

(52) U.S. Cl.
CPC .............. *E05B 77/54* (2013.01); *E05B 81/58* (2013.01); *E05B 83/36* (2013.01); *G05D 1/0011* (2013.01); *B60W 2520/06* (2013.01); *B60W 2520/10* (2013.01); *B60W 2520/12* (2013.01); *B60W 2554/4041* (2020.02); *B60W 2556/10* (2020.02)

(58) Field of Classification Search
CPC ..... B60W 2520/12; B60W 2554/4041; B60W 2556/10; E05B 77/54; E05B 81/58; E05B 83/36; G05D 1/0011
See application file for complete search history.

(56) References Cited

U.S. PATENT DOCUMENTS

| | | |
|---|---|---|
| 2015/0332530 A1 | 11/2015 | Kishita |
| 2015/0353080 A1* | 12/2015 | Mukaiyama ............ E05B 77/54 |
| | | 701/23 |
| 2016/0148450 A1 | 5/2016 | Ohshima |
| 2017/0298659 A1 | 10/2017 | Watanabe |
| 2018/0093631 A1 | 4/2018 | Lee et al. |
| 2018/0144566 A1 | 5/2018 | Ohshima |
| 2018/0329410 A1 | 11/2018 | Schuler |
| 2019/0225209 A1* | 7/2019 | Seki ................ B60W 60/0051 |
| 2020/0079360 A1* | 3/2020 | Tsujino ................ B60W 30/06 |
| 2020/0150657 A1* | 5/2020 | Yoo ......................... B60R 25/20 |

FOREIGN PATENT DOCUMENTS

| | | |
|---|---|---|
| CN | 107217925 A | 9/2017 |
| CN | 108340912 A | 7/2018 |
| JP | 2003-221960 A | 8/2003 |
| JP | 2016-053242 A | 4/2016 |
| JP | 2016-097927 A | 5/2016 |
| WO | 2018/083799 A1 | 5/2018 |

* cited by examiner

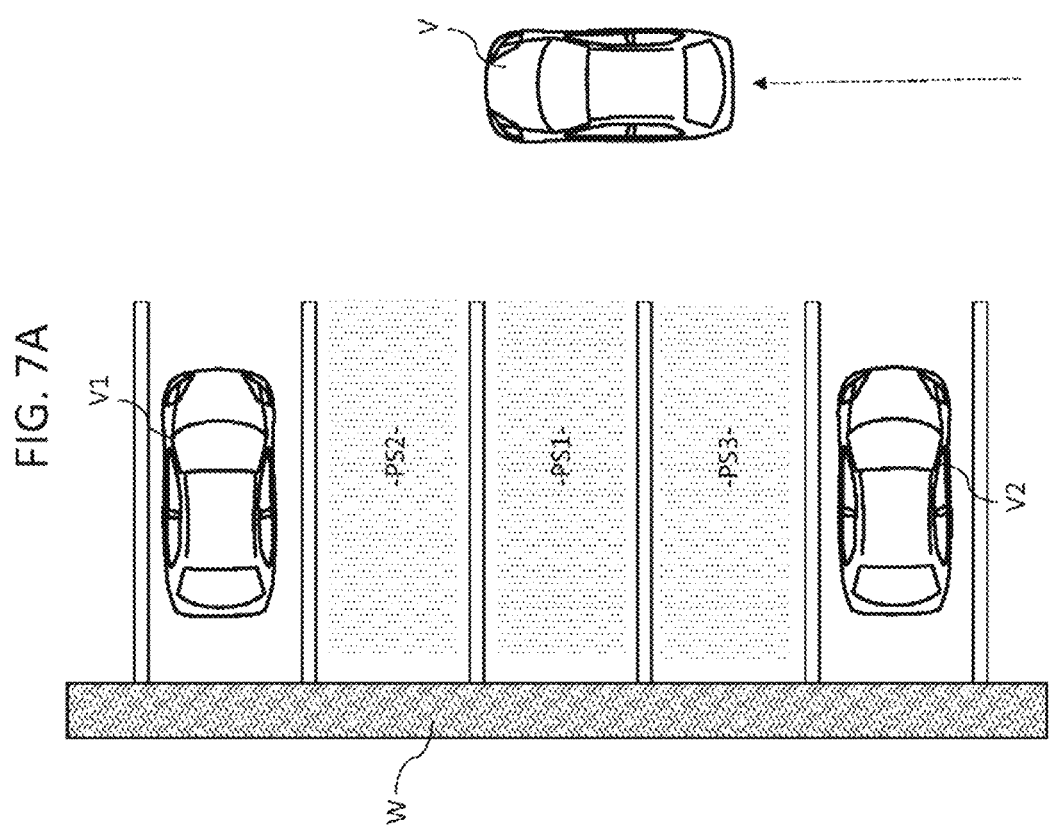

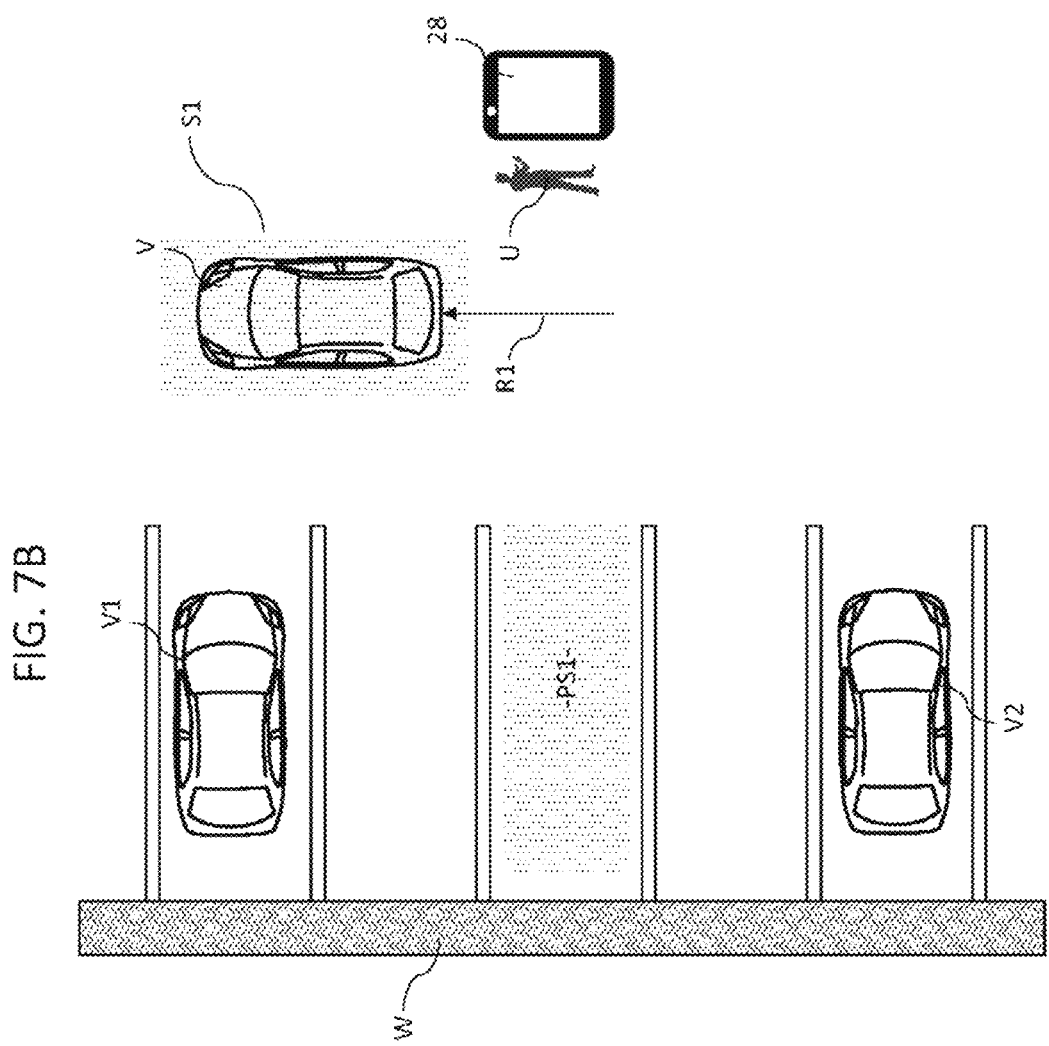

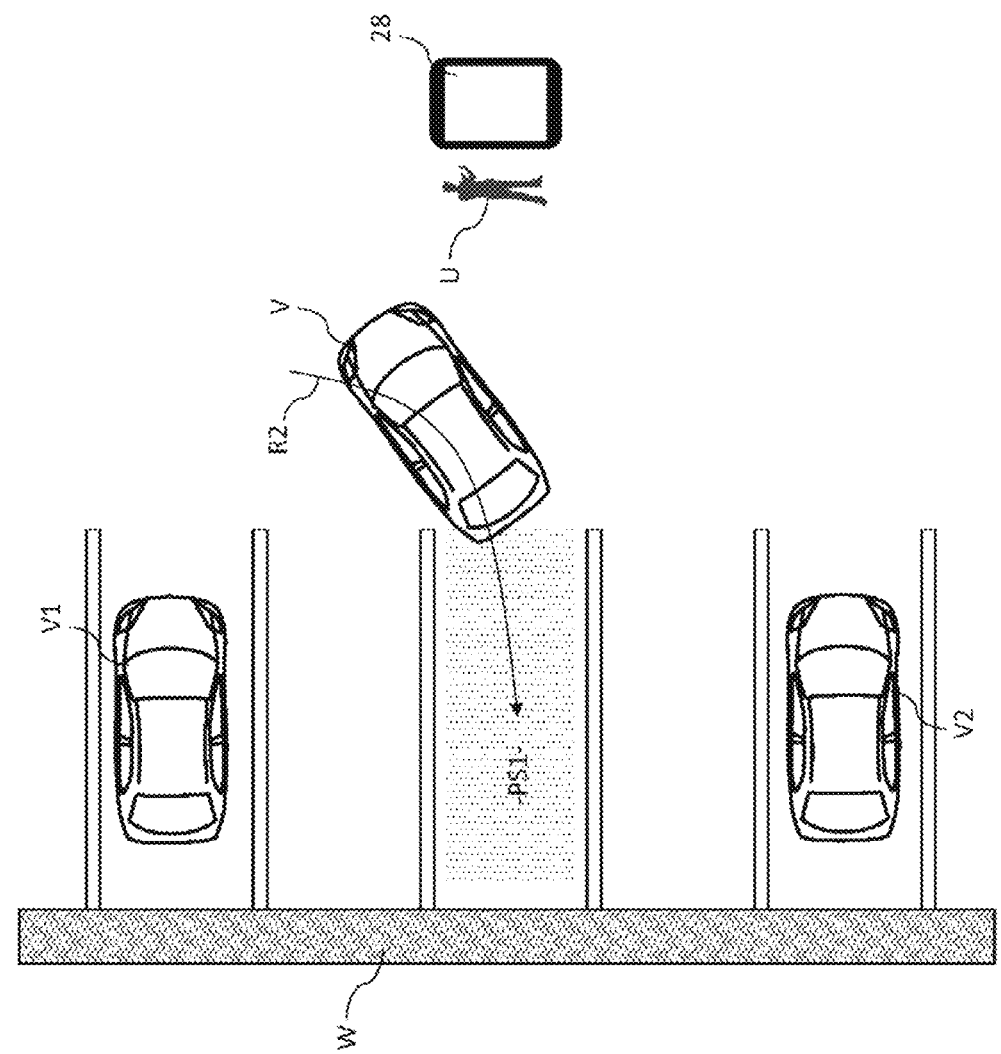

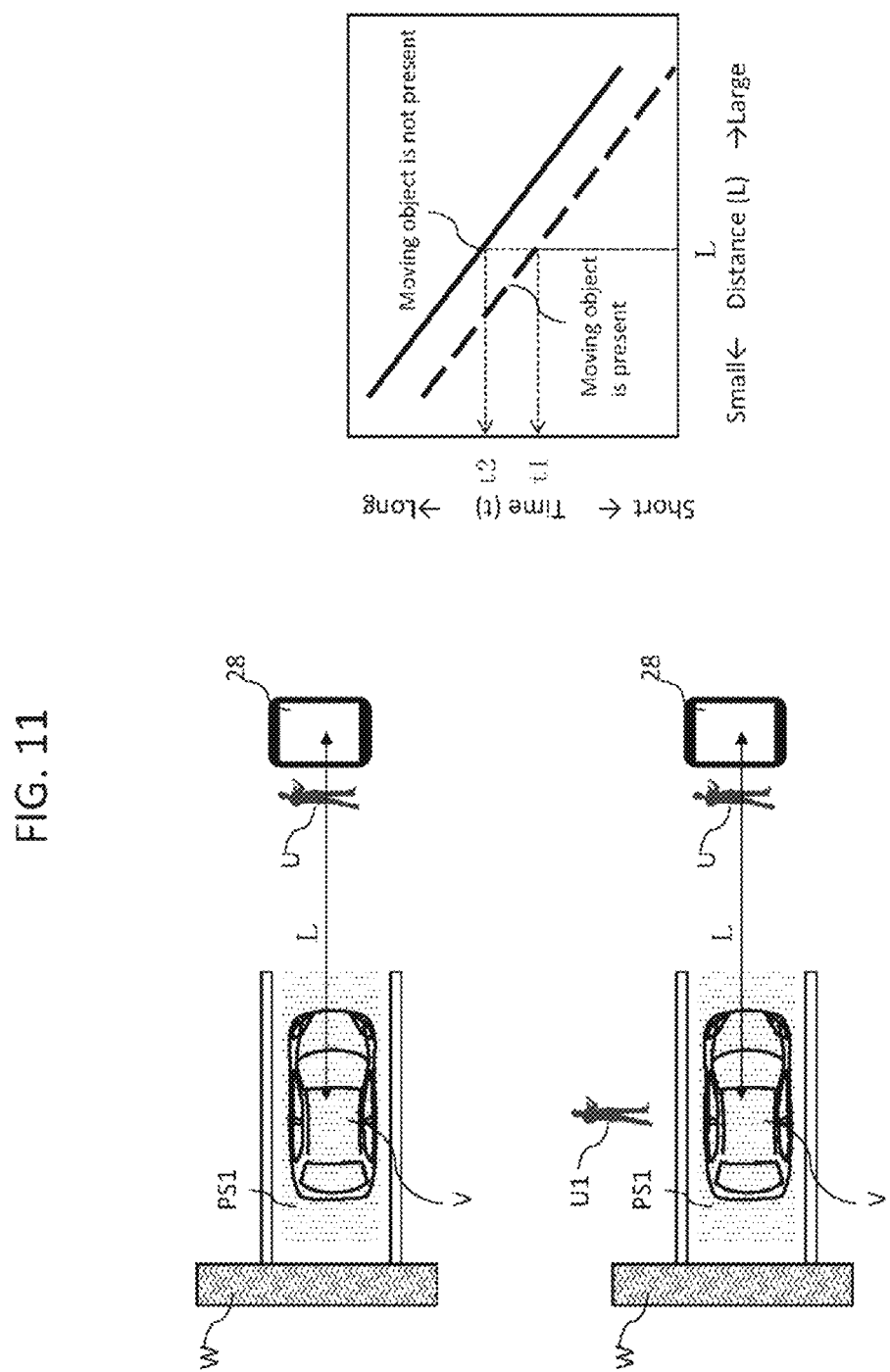

VEHICLE TRAVEL CONTROL METHOD AND VEHICLE TRAVEL CONTROL DEVICE

TECHNICAL FIELD

The present invention relates to a vehicle travel control method and a vehicle travel control apparatus for remotely operating a subject vehicle capable of autonomous travel control.

BACKGROUND

A device for locking/unlocking vehicle doors via wireless communication with a portable terminal is known, which operates to automatically lock the doors when the portable device is separated from the vehicle by a predetermined distance or more (JP2016-53242A).

SUMMARY

In autonomous travel control systems configured to remotely control a subject vehicle capable of autonomous travel control from outside the vehicle, there is a system having a specification in which the autonomous travel control by remote operation can be executed only when the doors are unlocked. Under such a restriction, if a system is applied which locks the doors when the portable device is separated from the vehicle by a predetermined distance or more as in the above prior art, a problem arises in that the doors cannot be locked at the timing in accordance with the situation because the autonomous travel control by remote operation is stopped at the same time as the locking.

A problem to be solved by the present invention is to provide a vehicle travel control method and a vehicle travel control apparatus with which, when the subject vehicle capable of autonomous travel control is remotely operated from outside the vehicle, the doors can be locked at the timing in accordance with the situation even under a precondition for the autonomous travel control that the doors are unlocked.

The present invention solves the above problem through prohibiting automatic locking/unlocking function from locking a locking/unlocking device for a door while the vehicle is executing the autonomous travel control; setting a temporal interval from when the vehicle stops until the locking/unlocking device for the door is locked using the automatic locking/unlocking function to a temporal interval in accordance with the distance between the vehicle and a remote operation device when the vehicle stops at a target stop position; and locking the locking/unlocking device for the door using the automatic locking/unlocking function when the temporal interval has elapsed.

According to the present invention, when the vehicle is executing the autonomous travel control, the automatic locking/unlocking function is prohibited from locking the locking/unlocking device for the door, while on the other hand, the automatic locking time from when the vehicle stops is set to a time in accordance with the distance between the vehicle and the remote operation device, and the door can therefore be automatically locked at the timing in accordance with the situation.

BRIEF DESCRIPTION OF THE DRAWINGS

FIG. 7A is a plan view (part 1) illustrating an example of remote reverse parking executed in the remote parking system of FIG. 1;

FIG. 7B is a plan view (part 2) illustrating an example of remote reverse parking executed in the remote parking system of FIG. 1;

FIG. 7C is a plan view (part 3) illustrating an example of remote reverse parking executed in the remote parking system of FIG. 1;

FIG. 11 is a plan view illustrating an example of a scene to which the control map illustrated in FIG. 6C is applied.

DETAILED DESCRIPTION

Figure 1:
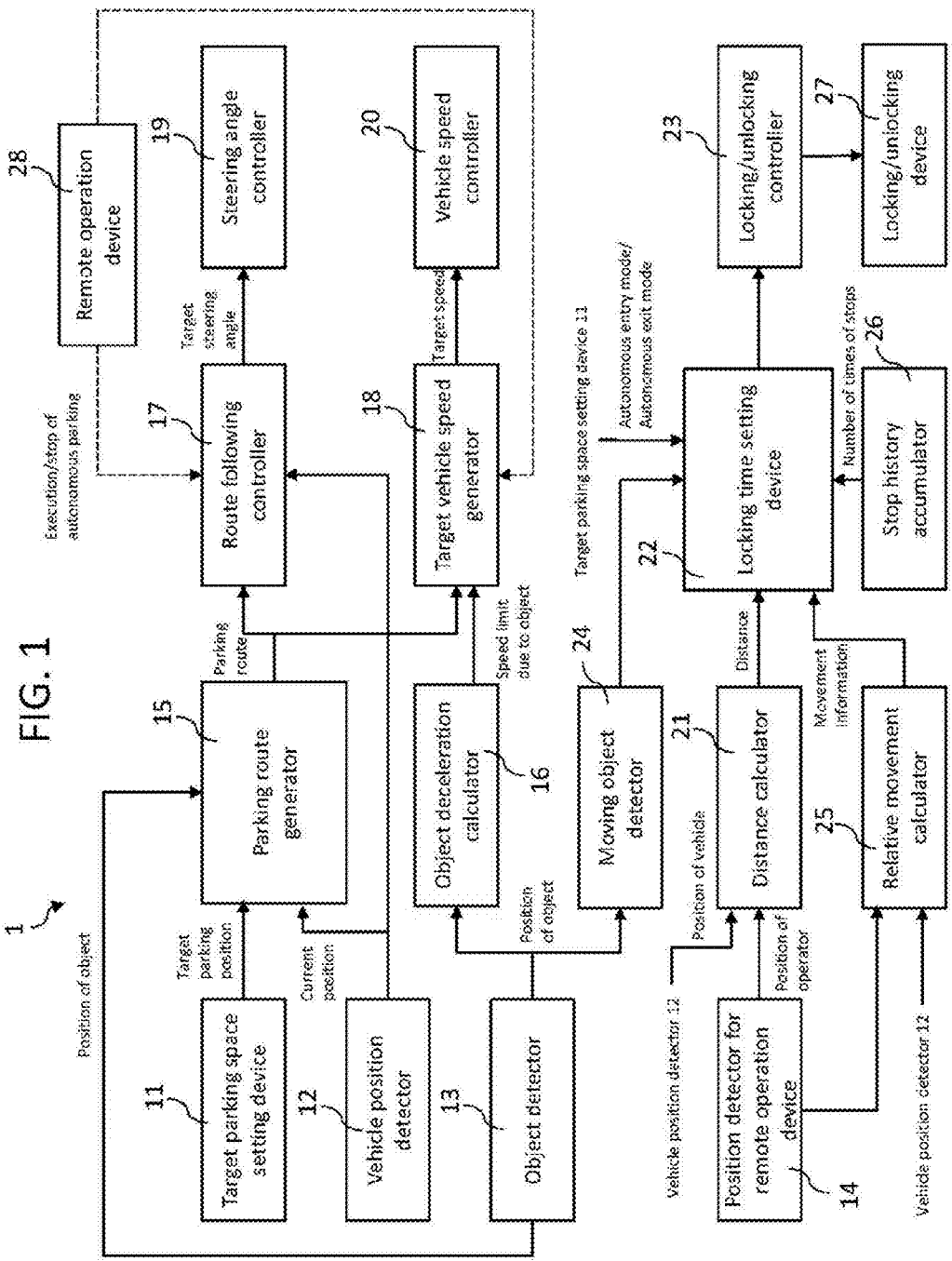
FIG. 1 is a block diagram illustrating a remote parking system to which the vehicle travel control method and vehicle travel control apparatus of the present invention are applied.

Hereinafter, one or more embodiments of the present invention will be described with reference to the drawings. FIG. 1 is a block diagram illustrating a remote parking system 1 to which the vehicle travel control method and vehicle travel control apparatus of the present invention are applied. In the present specification, "autonomous travel control" refers to controlling a vehicle to travel through automated or autonomous control executed by an onboard travel control apparatus without relying on a driver's driving operation, while "autonomous parking control," which is one type of the autonomous travel control, refers to controlling a vehicle to park (enter or exit a parking space or a garage) through automated or autonomous control executed by an onboard travel control apparatus without relying on a driver's driving operation. Also in the present specification, "parking" refers to continuously stopping a vehicle in a parking space, but the term "parking route" encompasses not only a route for entry into a parking space or a garage but also a route for exit from a parking space or a garage. In this sense, the "vehicle travel control method and vehicle travel control apparatus used when parking" encompass both the travel control of a vehicle at the time of entry into a parking space or a garage and the travel control of a vehicle at the time of exit from a parking space or a garage. The entry into a parking space or a garage may be simply referred to as entry or entering, and the exit from a parking space or a garage may be simply referred to as exit or exiting. In the following embodiments, specific examples of the present invention will be described with reference to an example in which the travel control method and travel control apparatus according to the present invention are applied to the autonomous parking control by remote operation.

The remote parking system 1 according to one or more embodiments of the present invention is a system for performing the operation of entry into or exit from a parking space or a garage by the autonomous travel control when performing the operation. During the operation, the driver gets off the vehicle and continues to transmit an execution command from a remote operation device while confirming safety, thereby to maintain the autonomous parking control. When the vehicle may collide with an obstacle, the autonomous parking control is stopped by transmitting a stop command or stopping transmission of the execution command. In the following description, the autonomous travel control mode for entry with the use of remote operation will be referred to as a remote entry mode, and the autonomous travel control mode for exit with the use of remote operation will be referred to as a remote exit mode.

In a narrow parking space in which side doors cannot be fully opened, such as a narrow garage or a parking lot in which other vehicles are parked on both sides, for example, it may be difficult for the driver to get on or get off the vehicle. To enable parking even in such a case, the remote entry mode or remote exit mode is used together with the remote operation. In the case of entry into a parking space, after the remote entry mode is initiated to calculate the entry route into the selected parking space and start the autonomous entry control, the driver gets off the vehicle while carrying the remote operation device and continues to transmit the execution command from the remote operation device to complete the entry into the selected parking space. On the other hand, in the case of exit from the parking space, the driver turns on the internal combustion engine or drive motor of the vehicle using the remote operation device carried by the driver, and after the remote exit mode is initiated to calculate the exit route to a selected exit position and start the autonomous exit control, the driver continues to transmit the execution command from the remote operation device to complete the exit from the parking space and thereafter gets on the vehicle. Thus, the remote parking system 1 according to one or more embodiments of the present invention is a system that has the remote entry mode with the use of such a remote operation and the remote exit mode also with the use of remote operation. In particular, the autonomous travel control according to one or more embodiments of the present invention is established under the precondition that the doors of a subject vehicle V are in an unlocking state (unlocked), and when a locking/unlocking device for the doors comes into a locking state (locked) at the time of starting the autonomous travel control and during the autonomous travel control, the autonomous travel control is suspended. An example of the autonomous parking control will be exemplified as autonomous reverse parking control illustrated in FIGS. 7A to 7D, but the present invention can also be applied to autonomous parallel parking and other autonomous parking.

The remote parking system 1 according to one or more embodiments of the present invention includes a target parking space setting device 11, a vehicle position detector 12, an object detector 13, a position detector 14 for remote operation device, a parking route generator 15, an object deceleration calculator 16, a route following controller 17, a target vehicle speed generator 18, a steering angle controller 19, a vehicle speed controller 20, a distance calculator 21, a locking time setting device 22, a locking/unlocking controller 23, a moving object detector 24, a relative movement calculator 25, a stop history accumulator 26, a locking/unlocking device 27, and a remote operation device 28. Each configuration will be described below.

In the remote entry mode, the target parking space setting device 11 searches for parking spaces existing around the subject vehicle, allows the operator to select a desired parking space (corresponding to the target stop position according to the present invention) from among available parking spaces, and outputs positional information of the parking space (such as the coordinates of a relative position from the current position of the subject vehicle and the latitude/longitude) to the parking route generator 15. In the remote exit mode, the target parking space setting device 11 searches for exit spaces existing around the subject vehicle which is currently parked, allows the operator to select a desired exit space from among available exit spaces, and outputs positional information of the exit space (such as the coordinates of a relative position from the current position of the subject vehicle and the latitude/longitude) to the parking route generator 15. The exit space refers to a temporary stop position for the subject vehicle (corresponding to the target stop position according to the present invention) at which the operator gets on the subject vehicle after performing the exit operation in the remote exit mode.

To achieve the above-described functions, the target parking space setting device 11 includes an input switch that inputs and operates the remote entry mode or the remote exit mode, a plurality of cameras (not illustrated, the object detector 13 to be described later may serve as the cameras) that capture images around the subject vehicle, a computer that is installed with a software program for searching for available parking spaces from image data captured by the cameras, and a touch panel-type display that displays an image including the available parking spaces. When an operator such as a driver selects the remote entry mode using the input switch, the cameras acquire the image data around the subject vehicle, and the display displays the image including the available parking spaces. When the operator selects a desired parking space from among the displayed parking spaces, the target parking space setting device 11 outputs the positional information of the parking space (such as the coordinates of a relative position from the current position of the subject vehicle and the latitude/longitude) to the parking route generator 15. Upon search for the available parking spaces, when the map information stored in a navigation device includes parking lot information having detailed positional information, the parking lot information may be used. When the operator such as the driver starts the internal combustion engine or drive motor of the subject vehicle using the remote operation device 28 and selects the remote exit mode via the input switch of the remote operation device 28, the cameras acquire the image data around the subject vehicle, and the display of the remote operation device 28 displays the image including the available exit spaces. Then, when the operator selects a desired exit space from among the displayed exit spaces, the target parking space setting device 11 outputs the positional information of the exit space (such as the coordinates of a relative position from the current position of the subject vehicle and the latitude/longitude) to the parking route generator 15.

The vehicle position detector 12 is composed of a GPS unit, a gyro sensor, a vehicle speed sensor, and other components. The vehicle position detector 12 detects radio waves transmitted from a plurality of satellite communications using the GPS unit to periodically acquire positional information of the subject vehicle and detects the current position of the subject vehicle on the basis of the acquired positional information of the subject vehicle, the angle change information acquired from the gyro sensor, and the vehicle speed acquired from the vehicle speed sensor. The positional information of the subject vehicle detected by the vehicle position detector 12 is output to the parking route generator 15 and the route following controller 17 at predetermined time intervals.

The object detector 13 is configured to search for whether or not an object such as an obstacle is present around the subject vehicle. The object detector 13 includes a camera, radar (such as millimeter-wave radar, laser radar, or ultrasonic radar), sonar, or the like or a combination thereof. The camera, radar, sonar, or the like or a combination thereof is attached to an outer panel part of the subject vehicle. The position to which the object detector 13 is attached is not particularly limited. One or more object detectors 13 can be attached, for example, to all or part of sites of the center and both sides of the front bumper, the center and both sides of the rear bumper, the sill outers below the right and left center pillars, and the like. Each object detector 13 further includes a computer installed with a software program for specifying the position of an object detected by the camera, radar, or the like, and the specified object information (target object information) and its positional information (such as the coordinates of a relative position from the current position of the subject vehicle and the latitude/longitude) are output to the parking route generator 15 and the object deceleration calculator 16. Before the start of the autonomous parking control, the specified object information and its positional information are used by the parking route generator 15 to generate a parking route. When an object such as an abrupt obstacle is detected during the autonomous parking control, the specified object information and its positional information are used by the object deceleration calculator 16 to decelerate or stop the subject vehicle.

Figure 2:
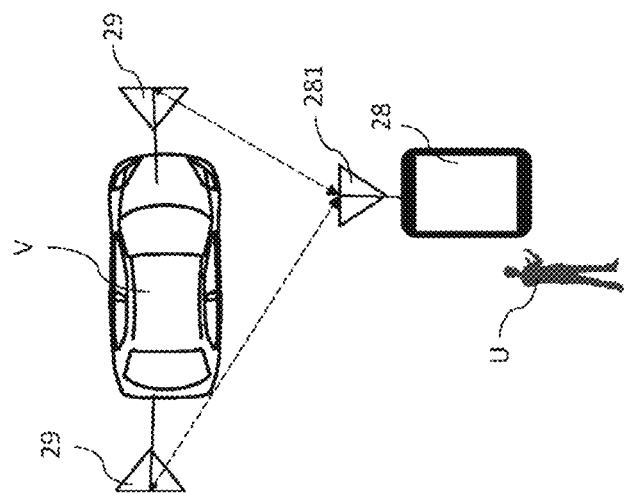
FIG. 2 is a diagram illustrating an example of a position detector for a remote operation device of FIG. 1.

The position detector 14 for the remote operation device 28 is a device for specifying the position of the remote operation device 28, which will be described later, when the remote operation device 28 is taken out of the vehicle. As illustrated in FIG. 2, for example, the position detector 14 is composed of at least two antennas 29 and 29 provided at different positions of the subject vehicle V, an antenna 281 of the remote operation device 28, sensors that detect radio field intensities between the antennas 29 and 29 of the vehicle V and the antenna 281 of the remote operation device, and a computer installed with a software program for calculating the position of the remote operation device 28 from the radio field intensities detected by the sensors using a triangulation method or the like. The radio waves for specifying the position of the remote operation device 28 are continuously transmitted at predetermined time intervals, and the position of the remote operation device 28, which changes momentarily, with respect to the subject vehicle V is specified, for example, as relative positional information to the subject vehicle V. The radio waves for specifying the position of the remote operation device 28 can be generated using the execution command signal from the remote operation device 28.

The radio waves for specifying the position of the remote operation device 28 may be transmitted from the antenna 281 of the remote operation device 28 to the antennas 29 and 29 of the vehicle V at predetermined time intervals or may also be transmitted from the antennas 29 and 29 of the vehicle V to the antenna 281 of the remote operation device 28 at predetermined time intervals. In the former case, the vehicle V is provided with the sensors that detect the radio field intensities between the antennas 29 and 29 of the vehicle V and the antenna 281 of the remote operation device and the computer installed with a software program for calculating the position of the remote operation device 28 from the radio field intensities detected by the sensors using a triangulation method or the like. In the latter case, the remote operation device 28 is provided with the sensors and the computer. The positional information of the remote operation device (positional information relative to the subject vehicle V) detected by the position detector 14 for the remote operation device 28 is output to the distance calculator 21. The remote operation device 28 is taken out of the vehicle by the operator, and therefore the positional information of the remote operation device 28 detected by the position detector 14 for the remote operation device 28 is also the positional information of the operator.

The parking route generator 15 receives the size of the subject vehicle (such as a vehicle width, a vehicle length, or a minimum turning radius) which is preliminarily stored, the target parking position (which refers to the positional information of the parking space in the case of the remote entry mode or the positional information of the exit space in the case of the remote exit mode, here and hereinafter) from the target parking space setting device 11, the current positional information of the subject vehicle from the vehicle position detector 12, and the positional information of an object (obstacle) from the object detector 13 and calculates a parking route from the current position of the subject vehicle to the target parking position (the parking route refers to the entry route in the case of the remote entry mode or the exit route in the case of the remote exit mode, here and hereinafter). The parking route is calculated so as not to collide or interfere with an object. FIGS. 7A to 7D are plan views illustrating an example of the remote entry mode. At the current position of the subject vehicle V illustrated in FIG. 7A, when the driver operates the input switch to select the remote entry mode, the target parking space setting device 11 searches for three available parking spaces PS1 to PS3 and displays an image including these parking spaces on a display. Here, it is assumed that the driver selects the parking space PS1 in response to the displayed image. In this case, the parking route generator 15 calculates entry routes R1 and R2 from the current position illustrated in FIG. 7A to the parking space PS1 illustrated in FIGS. 7B, 7C, and 7D.

Figure 7D:
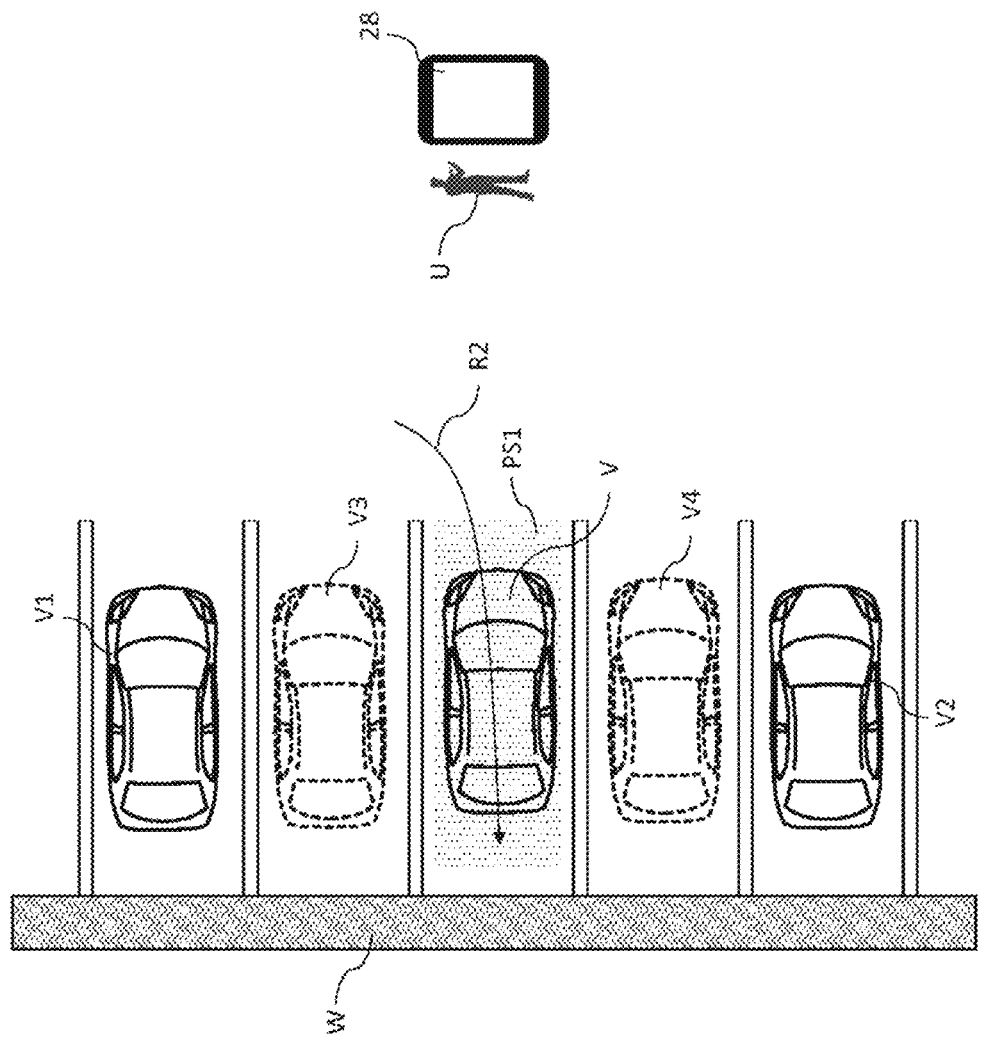
FIG. 7D is a plan view (part 4) illustrating an example of remote reverse parking executed in the remote parking system of FIG. 1.

On the other hand, at the parking position illustrated in FIG. 7D, when other vehicles V3 and V4 are parked on both sides of the subject vehicle V as indicated by dotted lines and it is difficult for the driver to open the door to get on the vehicle, the remote exit mode can be used to control the subject vehicle V to exit the parking space. This will be more specifically described. In the state illustrated in FIG. 7D, when the driver starts the internal combustion engine or drive motor of the subject vehicle V using the remote operation device 28 and operates the input switch of the remote operation device 28 to select the remote exit mode, the target parking space setting device 11 searches for an available exit space S1 illustrated in FIG. 7B, for example, and displays the exit space S1 on the display of the remote operation device 28. When the driver selects the exit space S1 in response to the display, the parking route generator 15 calculates an exit route from the current position illustrated in FIG. 7D to the exit space illustrated in FIGS. 7C and 7B. Thus, the parking route generator 15 calculates the entry route from the current position to the parking space in the case of the remote entry mode or calculates the exit route from the current position to the exit space in the case of the remote exit mode. Then, the parking route generator 15 outputs the entry route or the exit route to the route following controller 17 and the target vehicle speed generator 18.

The object deceleration calculator 16 receives the positional information of obstacles and other objects from the object detector 13 and operates to calculate the time for the subject vehicle to collide with an object (TTC: Time to Collision) on the basis of the distance from the object and the vehicle speed and calculate the deceleration start timing of the subject vehicle. For example, in the remote entry mode illustrated in FIGS. 7A to 7D, when the object as an obstacle is a wall W of the parking lot and the distance from the wall W is a predetermined value or more as illustrated in FIGS. 7A to 7C, the vehicle speed is set to an initial set value, and the vehicle speed of the subject vehicle V is decelerated at the timing when the time TTC for the subject vehicle V to collide with the wall W becomes a predetermined value or less as illustrated in FIG. 7D. Likewise, also when an abrupt obstacle is detected on the parking route during execution of the sequential autonomous parking control illustrated in FIGS. 7A to 7D, the subject vehicle V is decelerated or stopped at the timing when the time TTC for the subject vehicle V to collide with the obstacle becomes a predetermined value or less. This deceleration start timing is output to the target vehicle speed generator 18.

The route following controller 17 calculates, at predetermined time intervals, a target steering angle for the subject vehicle to follow a route along the entry route or the exit route on the basis of the entry route or the exit route from the parking route generator 15 and the current position of the subject vehicle from the vehicle position detector 12. As for the entry routes R1 and R2 of FIGS. 7A to 7D, the route following controller 17 calculates, at a predetermined time interval for each current position of the subject vehicle V, a target steering angle along the entry route R1 for traveling straight ahead from the current position illustrated in FIG. 7A to the position of turn for parking illustrated in FIG. 7B and a target steering angle along the entry route R2 for turning left from the position of turn for parking illustrated in FIG. 7B to the parking position illustrated in FIG. 7C and FIG. 7D and outputs the calculated target steering angles to the steering angle controller 19.

The target vehicle speed generator 18 calculates, at predetermined time intervals, a target vehicle speed for the subject vehicle V to follow a route along the entry route or the exit route on the basis of the entry route or the exit route from the parking route generator 15 and the deceleration start timing from the object deceleration calculator 16. As for the entry routes of FIGS. 7A to 7D, the target vehicle speed generator 18 calculates, at a predetermined time interval for each current position of the subject vehicle V, a target vehicle speed when starting from the current position illustrated in FIG. 7A and stopping at the position of turn for parking illustrated in FIG. 7B, a target vehicle speed when starting (backing) from the position of turn for parking illustrated in FIG. 7B and turning left on the way to the parking position illustrated in FIG. 7C, and a target vehicle speed when approaching the wall W illustrated in FIG. 7D and outputs the calculated target vehicle speeds to the vehicle speed controller 20. When an abrupt obstacle is detected on the parking route during execution of the sequential autonomous parking control illustrated in FIGS. 7A to 7D, the timing of deceleration or stopping is output from the object deceleration calculator 16, and the target vehicle speed is therefore output to the vehicle speed controller 20 in accordance with that timing.

The steering angle controller 19 generates a control signal for operating a steering actuator provided in the steering system of the subject vehicle V on the basis of the target steering angle from the route following controller 17. The vehicle speed controller 20 generates a control signal for operating an accelerator actuator provided in the drive system of the subject vehicle V on the basis of the target vehicle speed from the target vehicle speed generator 18. The steering angle controller 19 and the vehicle speed controller 20 are concurrently controlled thereby to execute the autonomous parking control.

The remote operation device 28 is used by an operator U from outside of the vehicle to command whether to continue or stop the execution of the autonomous parking control which is set by the target parking space setting device 11. To this end, the remote operation device 28 has a short-range communication function (such as using the antenna 281 illustrated in FIG. 7) for transmitting an execution continuation command signal or an execution stop signal to the route following controller 17 and the target vehicle speed generator 18 (these may alternatively be the steering angle controller 19 and the vehicle speed controller 20) and performs communication with the antennas 29 and 29 provided in the vehicle V. The remote exit mode requires a start/stop switch for the drive system (internal combustion engine or drive motor) of the subject vehicle V, an input switch for inputting the remote exit mode, and a display for displaying an image including the exit space, and it is therefore preferred to configure the remote operation device 28 using a portable computer with these functions. A telecommunication network may be used as the means for transmitting the execution continuation command signal or the execution stop signal from the remote operation device 28 to the route following controller 17 and the target vehicle speed generator 18 (these may alternatively be the steering angle controller 19 and the vehicle speed controller 20). The remote operation device 28 may be provided with the locking/unlocking controller 23 that automatically locks and unlocks the locking/unlocking device 27 for doors of the subject vehicle V, which will be described later, by remote operation.

In particular, in the remote parking system 1 according to one or more embodiments of the present invention, the autonomous travel control is executed under the precondition that the locking/unlocking device 27 for doors (including front and rear doors) of the subject vehicle V is in the unlocking state (unlocked). That is, when the door locking/unlocking device 27 is in the locking state (locked), the autonomous travel control is not established and started, but also when the locking/unlocking device 27 for doors comes into the locking state from the unlocking state during the autonomous travel control, the autonomous travel control is suspended. Any of conventionally-known locking/unlocking devices can be used as the locking/unlocking device 27. The locking/unlocking device 27 is configured to automatically lock and unlock one or more doors using actuators. The locking/unlocking controller 23 is configured to automatically lock the locking/unlocking device 27 in response to the locking command signal from the locking time setting device 22, which will be describe later. Additionally or alternatively, the locking/unlocking controller 23 may control the locking/unlocking device 27 to automatically lock or unlock the doors when receiving the locking command signal or unlocking command signal from a remote control key, which is not illustrated.

The distance calculator 21 calculates the distance, for example, the straight-line distance, between the subject vehicle V and the remote operation device 28 when the subject vehicle V stops at the target stop position, on the basis of the current position of the subject vehicle V from the vehicle position detector 12 and the current position of the remote operation device 28 from the position detector 14 for the remote operation device 28. For example, as illustrated in FIG. 2, the straight-line distance between the subject vehicle V and the remote operation device 28 is calculated using the position detector 14 for the remote operation device 28, that is, using the at least two antennas 29 and 29 provided at different positions of the subject vehicle V, the antenna 281 of the remote operation device 28, the sensors that detect the radio field intensities between the antennas 29 and 29 of the vehicle V and the antenna 281 of the remote operation device, and the computer installed with a software program for calculating the position of the remote operation device 28 from the radio field intensities detected by the sensors using a triangulation method or the like. The distance calculated by the distance calculator 21 is output to the locking time setting device 22.

The locking time setting device 22 sets a time t (which refers to a temporal interval and will also be simply referred to as a time, hereinafter) from when the subject vehicle V stops at the target stop position until the locking/unlocking device 27 for doors of the subject vehicle V is automatically locked to a time corresponding to the distance L between the subject vehicle V and the remote operation device 28 calculated by the distance calculator 21. Specifically, the locking time setting device 22 sets the relationship between the distance L and the time t as follows.

Figure 5A:
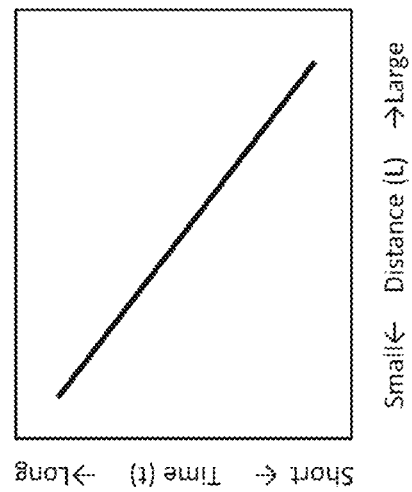
FIG. 5A is a diagram illustrating an example of a control map used by a locking time setting device of FIG. 1.
Figure 5B:
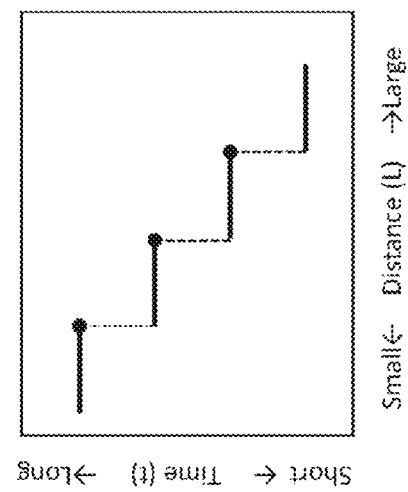
FIG. 5B is a diagram illustrating another example of a control map used by the locking time setting device of FIG. 1.

The locking time setting device 22 preferably sets the time t relatively longer as the distance L between the subject vehicle V and the remote operation device 28 calculated by the distance calculator 21 is shorter. For example, FIG. 5A is a diagram illustrating an example of a control map used by the locking time setting device 22. The example illustrated in FIG. 5A is an example in which the time t is set linearly and continuously longer as the distance L between the subject vehicle V and the remote operation device 28 calculated by the distance calculator 21 is shorter (a linear function with a negative inclination). FIG. 5B is a diagram illustrating another example of a control map used in the locking time setting device 22. The example illustrated in FIG. 5B is an example in which the time t is set stepwise longer as the distance L between the subject vehicle V and the remote operation device 28 calculated by the distance calculator 21 is shorter (substantially a linear function with a negative inclination). Although not illustrated, in FIG. 5A, the relationship may be a curved and continuous negative inclination relationship rather than a linear relationship. Although not illustrated, in FIG. 5B, the relationship at each stage may have a negative inclination. All of the above cases are included in the control examples in which the time t is set relatively longer as the distance L is shorter.

When the subject vehicle V stops at the target stop position, for example, when the subject vehicle V stops at the target parking space PS1 illustrated in FIG. 7D in the entry mode or when the subject vehicle V stops at the exit space S1 illustrated in FIG. 7B in the exit mode, it can be said that the probability of opening a door such as for getting into the subject vehicle V or loading or unloading a luggage is higher as the remote operation device 28, or the operator U, is closer to the subject vehicle V. In contrast, it can be said that the probability of performing such an operation is lower as the operator U is farther from the subject vehicle V. The time t is therefore set relatively longer as the distance L between the subject vehicle V and the remote operation device 28 calculated by the distance calculator 21 is shorter, so that the timing of locking the doors by the locking/unlocking device 27 can be set to appropriate timing, that is, timing in accordance with the situation, and it is possible to prevent the operator U from being bothered by unlocking the doors of the subject vehicle V using a remote control key or the like.

When the time t is set relatively longer as the distance L between the subject vehicle V and the remote operation device 28 calculated by the distance calculator 21 is shorter, at least any of the control factors illustrated in FIGS. 6A to 6D may be taken into consideration.

Figure 6A:
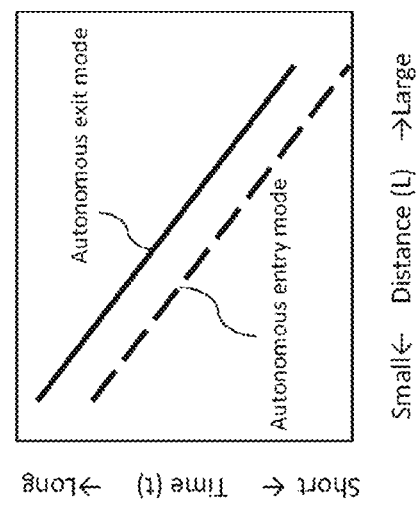
FIG. 6A is a diagram illustrating still another example of a control map used by the locking time setting device of FIG. 1.

FIG. 6A is a diagram illustrating still another example of the control map used in the locking time setting device 22, and this example is a modified example of the control map illustrated in FIG. 5A. In the example illustrated in FIG. 6A, in the autonomous travel control in which the subject vehicle V parked is controlled to exit to the target stop position (exit space S1), that is, in the autonomous exit mode, the time t (temporal interval) is set relatively longer than that in the autonomous travel control in which the subject vehicle V is controlled to enter the target stop position (target parking space PS1), that is, in the autonomous entry mode, even when the distance L between the subject vehicle V and the remote operation device 28 is the same. In other words, the time t-distance L control line in the autonomous exit mode indicated by the solid line in FIG. 6A is set such that the time at each distance L is longer than that of the time t-distance L control line in the autonomous entry mode indicated by the dotted line in the figure. Whether the autonomous travel control is in the autonomous entry mode or the autonomous exit mode can be determined by inputting the output from the target parking space setting device 11 to the locking time setting device 22. Although FIG. 6A illustrates a modified example of the control map illustrated in FIG. 5A, FIG. 5B and other control maps may also be similarly modified.

In general, after the subject vehicle V is controlled to exit to the exit space S1 in the autonomous exit mode, the operator U may load a luggage and then get on the subject vehicle V, and a certain amount of time is therefore required. In contrast, after the subject vehicle V is controlled to enter the parking space PS1 in the autonomous entry mode, the operator U often completes the operation without any additional operation and leaves the parking space PS1. In the case of the autonomous exit mode, therefore, the time t to the distance L is set relatively longer than that in the autonomous entry mode, so that the timing of locking the doors by the locking/unlocking device 27 can be set to appropriate timing, that is, timing in accordance with the situation, and it is possible to prevent the operator U from being bothered by unlocking the doors of the subject vehicle V using a remote control key or the like. Moreover, in the case of the autonomous entry mode, the timing of locking the doors can be shortened thereby to prevent a third person from getting on the subject vehicle V.

Figure 6B:
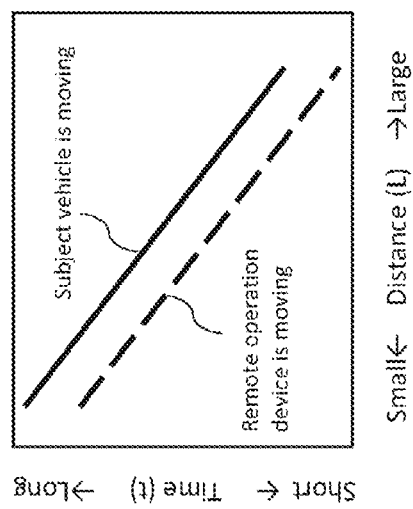
FIG. 6B is a diagram illustrating still another example of a control map used by the locking time setting device of FIG. 1.

FIG. 6B is a diagram illustrating still another example of the control map used in the locking time setting device 22, and this example is a modified example of the control map illustrated in FIG. 5A. In the example illustrated in FIG. 6B, the relative movement calculator 25 illustrated in FIG. 1 determines whether the subject vehicle V is traveling in a direction away from the remote operation device 28, or the operator U, or the remote operation device 28, or the operator U, is moving in a direction away from the subject vehicle V. When the subject vehicle V is traveling in the direction away from the remote operation device 28, the time t (temporal interval) is set relatively longer than that when the remote operation device 28 is moving in the direction away from the subject vehicle V even when the distance L between the subject vehicle V and the remote operation device 28 is the same. In other words, the time t-distance L control line indicated by the solid line in FIG. 6B when the subject vehicle V is moving is set such that the time at each distance L is longer than that of the time t-distance L control line indicated by the dotted line in the figure when the remote operation device 28 is moving.

To this end, the relative movement calculator 25 illustrated in FIG. 1 receives the position, vehicle speed, and traveling direction of the subject vehicle V before and after the subject vehicle V stops at the target stop position from the vehicle position detector 12 and receives the position, moving speed, and moving direction of the remote operation device 28 before and after the subject vehicle V stops at the target stop position from the position detector 14 for the remote operation device 28. Then, the relative movement calculator 25 calculates the moving direction of the subject vehicle V and the moving direction of the remote operation device 28 and determines whether the subject vehicle V is traveling in the direction away from the remote operation device 28 or the remote operation device 28 is moving in the direction away from the subject vehicle V before and after the subject vehicle V stops at the target stop position. Then, these movement information items are output to the locking time setting device 22. Although FIG. 6B illustrates a modified example of the control map illustrated in FIG. 5A, FIG. 5B and other control maps may also be similarly modified.

In general, when the subject vehicle V is traveling in the direction away from the remote operation device 28, or the operator U, the subject vehicle V may move away from the operator U depending on the standing position of the operator U such as in the autonomous entry mode or the autonomous exit mode, and in many cases the operator U may open the door to get on the vehicle, load a luggage, or unload a luggage after the vehicle stops. In contrast, when the remote operation device 28, or the operator U, is moving in the direction away from the subject vehicle V, the operator may often leave the place after the autonomous travel control is completed. Accordingly, when the subject vehicle V is traveling in the direction away from the remote operation device 28, the time t (temporal interval) is set relatively longer than that when the remote operation device 28 is moving in the direction away from the subject vehicle V even when the distance L between the subject vehicle V and the remote operation device 28 is the same, so that the timing of locking the doors by the locking/unlocking device 27 can be set to appropriate timing, that is, timing in accordance with the situation, and it is possible to prevent the operator U from being bothered by unlocking the doors of the subject vehicle V using a remote control key or the like. Moreover, when the remote operation device 28 is moving in the direction away from the subject vehicle V, the timing of locking the doors can be shortened thereby to prevent a third person from getting on the subject vehicle V.

Figure 6C:
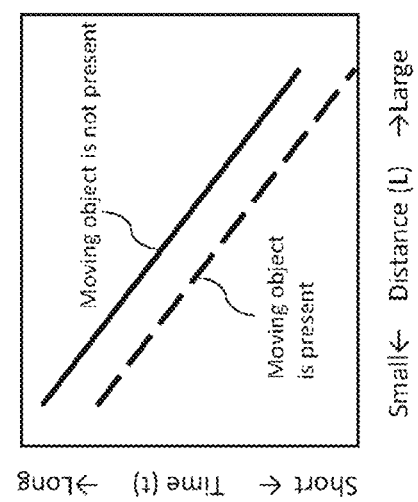
FIG. 6C is a diagram illustrating still another example of a control map used by the locking time setting device of FIG. 1.

FIG. 6C is a diagram illustrating still another example of the control map used in the locking time setting device 22, and this example is a modified example of the control map illustrated in FIG. 5A. In the example illustrated in FIG. 6C, when the subject vehicle V stops at the target stop position, the moving object detector 24 illustrated in FIG. 1 detects whether or not a moving object is present around the subject vehicle V. When a moving object is present, the time t (temporal interval) is set relatively shorter than that when no moving object is present even when the distance L between the subject vehicle V and the remote operation device 28 is the same. In other words, the time t-distance L control line indicated by the dotted line in FIG. 6C when a moving object is present around the subject vehicle V is set such that the time at each distance L is shorter than that of the time t-distance L control line indicated by the solid line in the figure when no moving object is present around the subject vehicle V.

To this end, the moving object detector 24 illustrated in FIG. 1 receives the position of an object from the object detector 13 at predetermined time intervals. When the position of the object changes with time, the moving object detector 24 determines that the object is a moving object, and outputs the presence of the moving object to the locking time setting device 22. When no object is detected by the object detector 13 or when an object is detected but the position of the object does not change, the moving object detector 24 determines that no moving object is present, and outputs this information to the locking time setting device 22. When the object detector 13 is composed of a camera or the like, the presence or absence of a person may be analyzed using image processing or the like, and information regarding the presence of the person may be output to the locking time setting device 22. Although FIG. 6C illustrates a modified example of the control map illustrated in FIG. 5A, FIG. 5B and other control maps may also be similarly modified.

When the subject vehicle V is stopped at the target stop position, if a person is present around the subject vehicle V, there is a possibility that the person may get on the subject vehicle V without permission. When a moving object such as a person is present around the subject vehicle V, therefore, the time t (temporal interval) is set relatively shorter than that when no moving object is present even when the distance L between the subject vehicle V and the remote operation device 28 is the same, and it is thereby possible to prevent a third person from getting on the subject vehicle V.

Figure 6D:
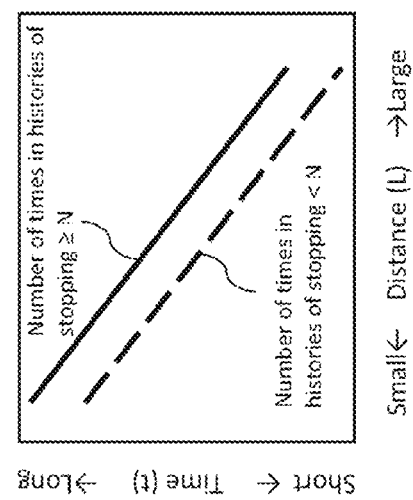
FIG. 6D is a diagram illustrating still another example of a control map used by the locking time setting device of FIG. 1.

FIG. 6D is a diagram illustrating still another example of the control map used in the locking time setting device 22, and this example is a modified example of the control map illustrated in FIG. 5A. In the example illustrated in FIG. 6D, the stop history accumulator 26 illustrated in FIG. 1 accumulates history information in which the subject vehicle V stops at the target stop position. The time t (temporal interval) is set relatively longer as the number of times in histories of stopping at the target stop position is larger even when the distance L between the subject vehicle V and the remote operation device 28 is the same. In other words, the time t-distance L control line indicated by the solid line in FIG. 6D when the number of times in histories in which the subject vehicle V stops at the target stop position is N times or more is set such that the time at each distance L is longer than that of the time t-distance L control line indicated by the dotted line in the figure when the number of times in histories in which the subject vehicle V stops at the target stop position is less than N times.

To this end, the stop history accumulator 26 illustrated in FIG. 1 accumulates the target stop position such as the parking space PS1 or the exit space S1 selected by the target parking space setting device 11 and outputs, to the locking time setting device 22, the number of times of stops as to how many times the target stop position selected by the target parking space setting device 11 in the present autonomous travel control is accumulated in the stop history accumulator 26. Although FIG. 6D illustrates a modified example of the control map illustrated in FIG. 5A, FIG. 5B and other control maps may also be similarly modified.

The fact that the target stop position selected by the operator U is accumulated in the stop history accumulator 26 many times means that the operator U frequently stops the vehicle at the target stop position, and it is therefore considered that the operator U is familiar with the environment around the target stop position. In contrast, if the target stop position is the position at which the vehicle is stopped for the first time, the operator U is less likely to know the environment around the target stop position. Accordingly, the time t (temporal interval) is set relatively longer as the number of times in histories of stopping at the target stop position is larger even when the distance L between the subject vehicle V and the remote operation device 28 is the same, so that the timing of locking the doors by the locking/unlocking device 27 can be set to appropriate timing, that is, timing in accordance with the situation, and it is possible to prevent the operator U from being bothered by unlocking the doors of the subject vehicle V using a remote control key or the like. Moreover, when the operator U is unfamiliar with the surrounding environment, such as when the vehicle is stopped at the target stop position for the first time, the timing of locking the doors can be shortened thereby to prevent a third person from getting on the subject vehicle V.

Figure 3:
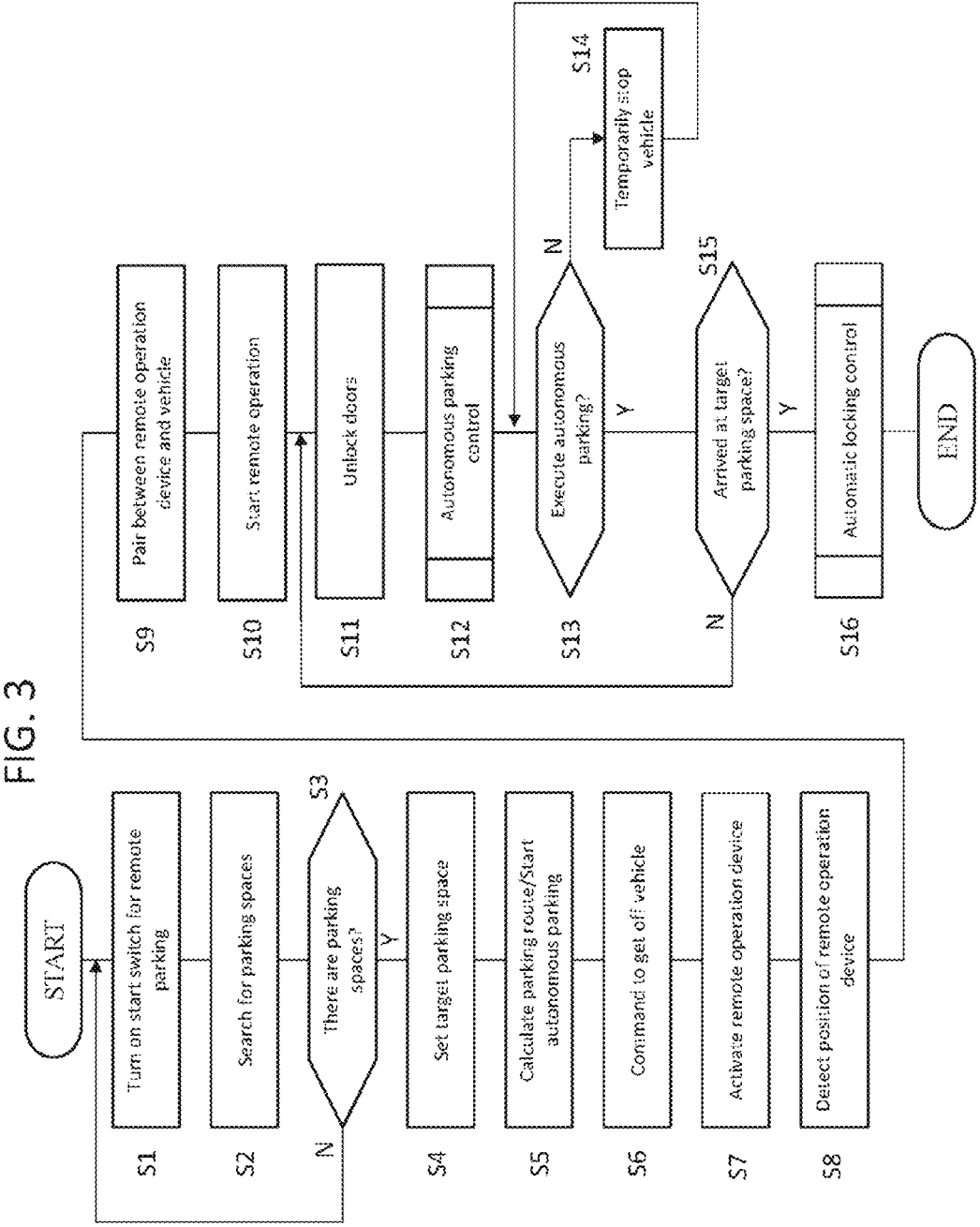
FIG. 3 is a flowchart illustrating the control procedure executed in the remote parking system of FIG. 1.

The control flow of the remote parking system 1 according to one or more embodiments of the present invention will then be described with reference to FIGS. 3 and 4. FIG. 3 is a flowchart illustrating a control procedure executed by the remote parking system 1 according to one or more embodiments of the present invention.

Here, a scene will be described in which the reverse parking illustrated in FIGS. 7A to 7D is executed by the autonomous parking control (entry). First, when the subject vehicle V arrives in the vicinity of parking spaces, in step S1, the operator U such as the driver turns on the remote parking start switch of the onboard target parking space setting device 11 to select the remote entry mode. In step S2, the target parking space setting device 11 searches for one or more available parking spaces for the subject vehicle V using a plurality of onboard cameras or the like. In step S3, the target parking space setting device 11 determines whether or not there are one or more available parking spaces. When there are one or more available parking spaces, the process proceeds to step S4, while when there are no available parking spaces, the process returns to step S1. When no available parking spaces are detected in step S2, the operator may be informed of this fact via a language display or voice, such as "there are no parking spaces," and this process may be concluded.

In step S4, the target parking space setting device 11 controls the onboard display to displays available parking spaces and encourages the operator U to select a desired parking space. When the operator U selects a specific parking space as a target parking space, the target parking space setting device 11 outputs the target parking position information to the parking route generator 15. In step S5, the parking route generator 15 generates parking routes R1 and R2 illustrated in FIGS. 7B to 7D from the current position of the subject vehicle V and the target parking position, and the object deceleration calculator 16 calculates the deceleration start timing in the autonomous parking control on the basis of the object information detected by the object detector 13. The parking routes generated by the parking route generator 15 are output to the route following controller 17, and the deceleration start timing calculated by the object deceleration calculator 16 is output to the target vehicle speed generator 18.

Through the above processes, the autonomous parking control comes into a standby state. When the operator U is encouraged to accept the start of the autonomous parking control and then accepts the start, the autonomous parking control is started. In the reverse parking illustrated in FIG. 7A, once the vehicle moves forward from the current position illustrated in FIG. 7A and reaches the position of turn for parking illustrated in FIG. 7B, the operator U is encouraged to get off the vehicle in step S6. Then, as illustrated in FIG. 7C, the vehicle moves backward while steering to the left and moves straight to the parking space PS1 illustrated in FIG. 7D.

When the operator U is encouraged to get off the vehicle in step S6 and gets off with the remote operation device 28 during the execution of such autonomous parking control, the operator U activates the remote operation device 28 in step S7. This starts the remote operation. Examples of the start input for the remote operation by the remote operation device 28 include the activation of the operation software program installed in the remote operation device 28, the operation of unlocking the doors, the operation of locking/unlocking the doors, and the activation of these operations and the operation software program. The subject vehicle V is in a stop state during steps S6 to S11.

In step S8, the position detector 14 for the remote operation device 28 detects the position of the remote operation device 28, and this positional information is output to the distance calculator 21. Then, in step S9, the pairing process between the remote operation device 28 and the subject vehicle V is performed. When the pairing process of step S9 enables the subject vehicle V to authenticate the remote operation device 28 so that the command can be received, the remote operation is started in step S10, followed by step S11, in which the locking/unlocking controller 23 outputs the unlocking command signal to the locking/unlocking device 27 to put the doors into the unlocking state (unlocked). This unlocking state of the doors establishes the start condition for the autonomous travel control, and the process proceeds to step S12, in which the autonomous parking control is executed.

In steps S12 to S14 of FIG. 3, the operator U continues to press the execution button of the remote operation device 28 thereby to maintain the execution of the remote parking control ("Y" in step S13). On the other hand, when the operator U presses the stop button of the remote operation device 28 (or releases the execution button), the stop command for the remote parking control is transmitted to the route following controller 17 and the target vehicle speed generator 18 (these may alternatively be the steering angle controller 19 and the vehicle speed controller 20), and the remote parking control is suspended (step S13→S14). In the case in which the safety is confirmed while the remote parking control is suspended or in other similar cases, the operator U continues to press the execution button of the remote operation device 28 again, and the execution of the remote parking control is thereby resumed (step S14→S13).

That is, when the operator U gets out of the vehicle and continues to press the execution button of the remote operation device 28, the route following controller 17 sequentially outputs the target steering angle along the parking routes to the steering angle controller 19, and the target vehicle speed generator 18 sequentially outputs the target vehicle speed along the parking routes to the vehicle speed controller 20. This allows the subject vehicle V to execute the autonomous parking control along the parking routes at the target vehicle speed. During this operation, the object detector 13 detects the presence or absence of an object such as an obstacle present around the subject vehicle V. When an obstacle is detected on the parking routes, the object deceleration calculator 16 calculates the deceleration start timing to decelerate or stop the subject vehicle V. The processes from step S11 to step S15, which is to be described later, are executed at predetermined time intervals until the subject vehicle V arrives at the target parking space in step S15. That is, the unlocking command signal for the doors in step S11 is output until the subject vehicle V arrives at the parking space as the target.

In step S15, a determination is made whether or not the subject vehicle V has arrived at the target parking space. When the subject vehicle V has not arrived, the process returns to step S11, while when the subject vehicle V has arrived at the target parking space, the process proceeds to step S16, in which the process transitions to the automatic locking control after the vehicle is stopped. FIG. 4 is a flowchart illustrating an example of the subroutine of step S16 in FIG. 3.

Figure 4:
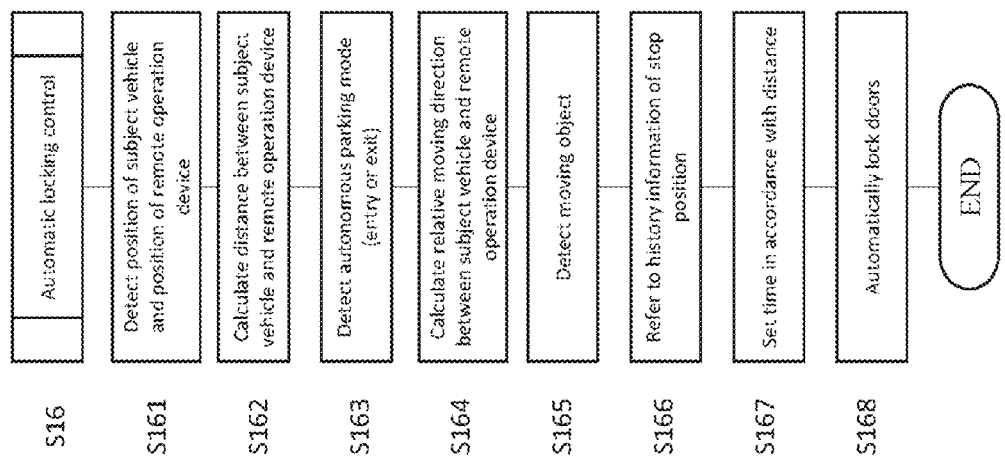
FIG. 4 is a flowchart illustrating an example of the subroutine of step S16 in FIG. 3.

In step S161 of FIG. 4, the current position of the subject vehicle V is detected by the vehicle position detector 12, and the current position of the remote operation device 28 is detected by the position detector 14 for the remote operation device 28. These current positions are output to the distance calculator 21. In step S162, the distance calculator 21 calculates the distance L between the current position of the subject vehicle V and the current position of the remote operation device 28 and outputs the distance L to the locking time setting device 22. When other control factors illustrated in FIGS. 6A to 6D are not taken into consideration, in step S167, the locking time setting device 22 sets the time t from when the subject vehicle V stops at the parking space PS1 until the doors are locked, on the basis of the time t-distance L control line illustrated in FIG. 5A or 5B and outputs the time t to the locking/unlocking controller 23. In step S168, the locking/unlocking controller 23 controls the locking/unlocking device 27 to lock the doors when the time t has elapsed. This situation is illustrated in FIG. 8.

Figure 8:
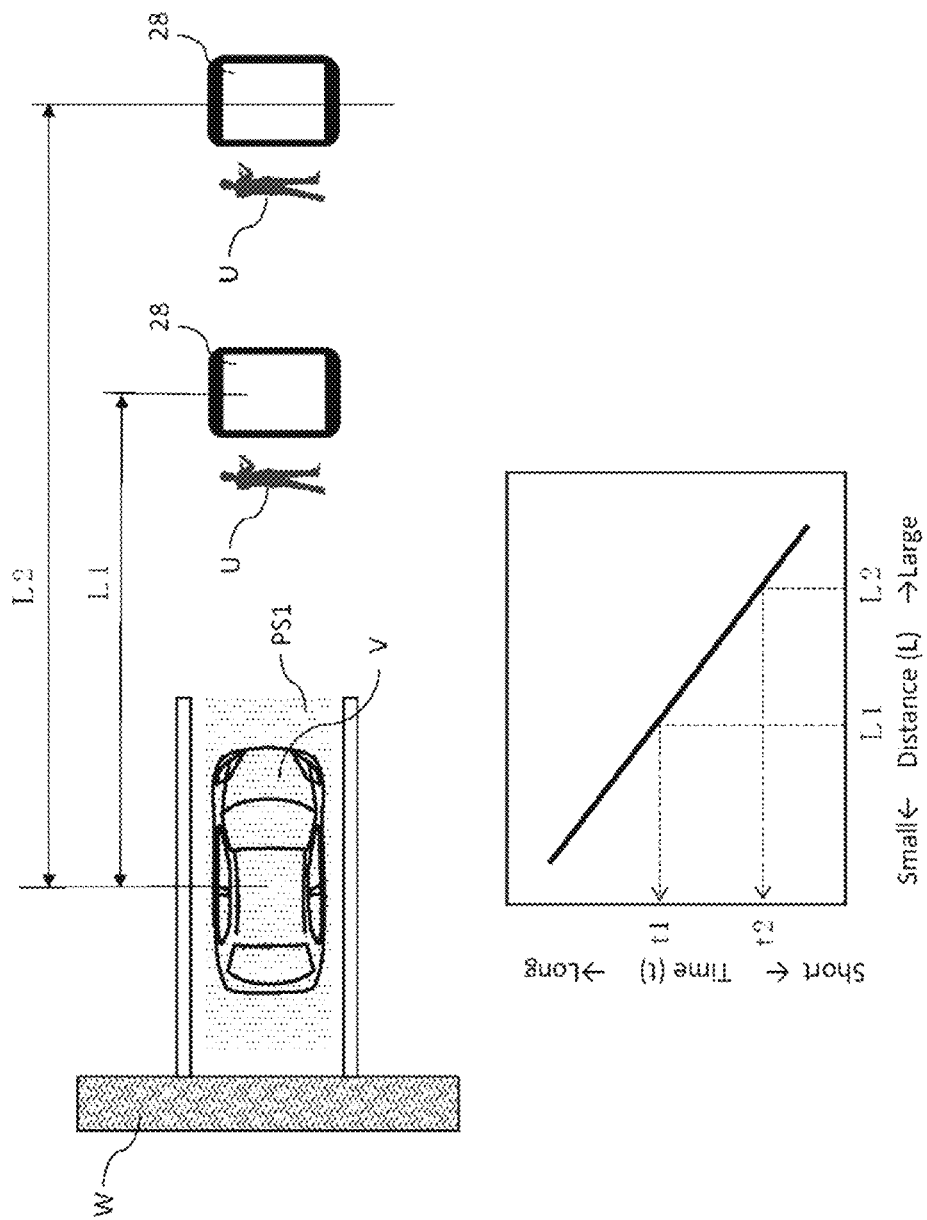
FIG. 8 is a plan view illustrating an example of a scene to which the control map illustrated in FIG. 5A or 5B is applied.

FIG. 8 is a set of diagrams illustrating an example of a scene to which the control map illustrated in FIG. 5A or 5B is applied. FIG. 8 illustrates a plan view of the scene in which the remote operation device 28 is located at a distance L1 or L2 from the subject vehicle V and the applied control map (the control map of FIG. 5A is exemplified in FIG. 8). This scene represents a case in which the subject vehicle V arrives and stops at the parking space PS1 which is the target stop position. When the distance between the subject vehicle V and the remote operation device 28 is L1, the time from when the subject vehicle V stops at the parking space PS1 until the doors are locked is set to t1, while when the distance between the subject vehicle V and the remote operation device 28 is L2 (>L1), the time from when the subject vehicle V stops at the parking space PS1 until the doors are locked is set to t2 (<t1).

In step S163 of FIG. 4, the locking time setting device 22 receives from the target parking space setting device 11 the information as to whether the control mode is the autonomous entry mode or the autonomous exit mode, and the control map illustrated in FIG. 6A is applied as substitute for the control maps illustrated in FIGS. 5A and 5B. In step S167, the locking time setting device 22 sets the time t from when the subject vehicle V stops at the parking space PS1 until the doors are locked, on the basis of the time t-distance L control line illustrated in FIG. 6A and outputs the time t to the locking/unlocking controller 23. In step S168, the locking/unlocking controller 23 controls the locking/unlocking device 27 to lock the doors when the time t has elapsed. This situation is illustrated in FIG. 9.

Figure 9:
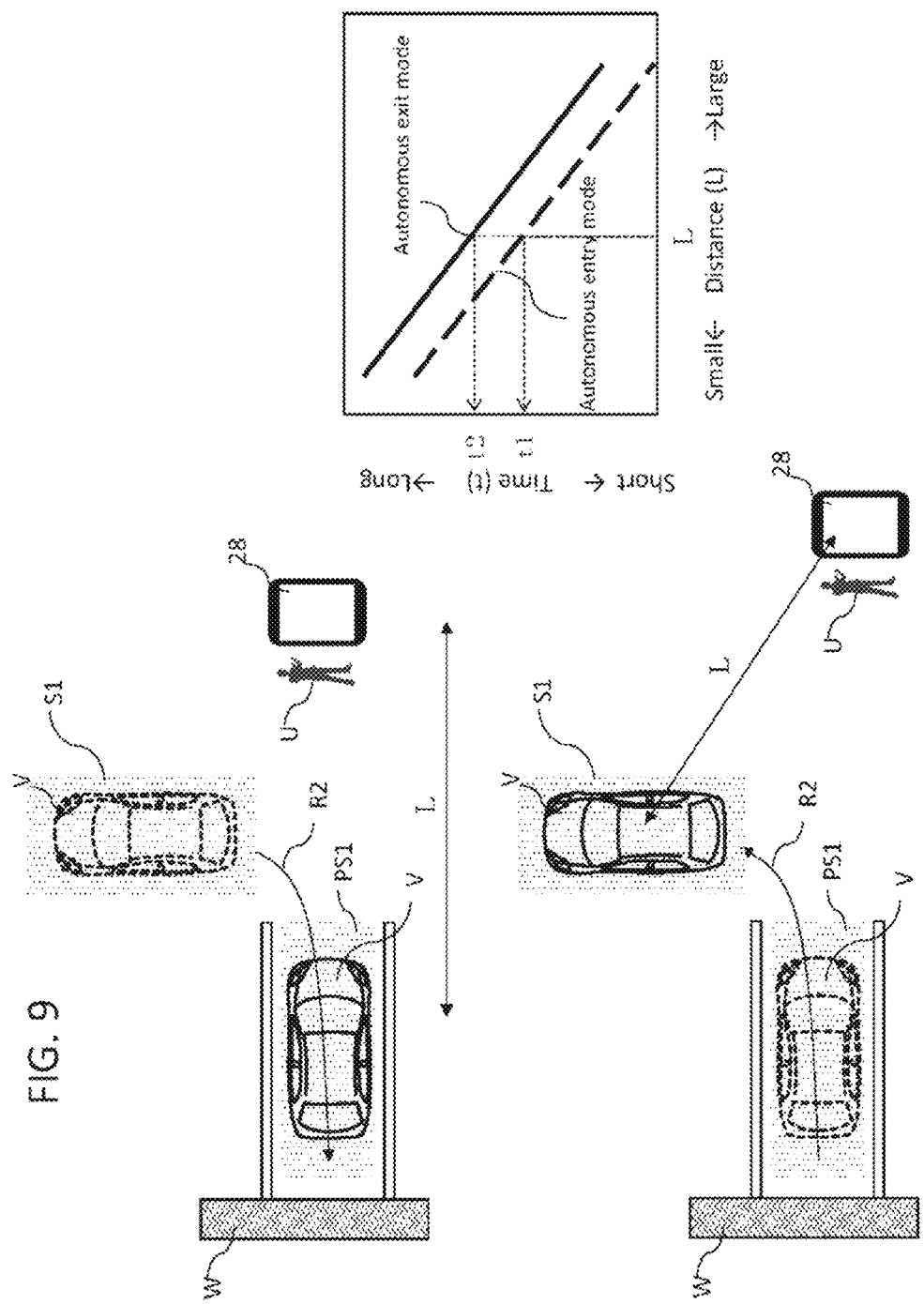
FIG. 9 is a plan view illustrating an example of a scene to which the control map illustrated in FIG. 6A is applied.

FIG. 9 is a set of diagrams illustrating an example of scenes to which the control map illustrated in FIG. 6A is applied. FIG. 9 illustrates a plan view of the scene (upper left diagram) in which the subject vehicle V enters the parking space in the autonomous entry mode, a plan view of the scene (lower left diagram) in which the subject vehicle V exits to the exit space in the autonomous exit mode, and the applied control map (in FIG. 9, the control map of FIG. 6A is exemplified in the right diagram). As illustrated in the upper left diagram of FIG. 9, in the scene in which the subject vehicle V arrives and stops at the parking space PS1, which is the target stop position, in the autonomous entry mode, when the distance between the subject vehicle V and the remote operation device 28 is L, the time from when the subject vehicle V stops at the parking space PS1 until the doors are locked is set to t1 as defined by the dotted line in the right diagram. On the other hand, as illustrated in the lower left diagram of FIG. 9, in the scene in which the subject vehicle V arrives and stops at the exit space S1, which is the target stop position, in the autonomous exit mode, when the distance between the subject vehicle V and the remote operation device 28 is L, the time from when the subject vehicle V stops at the exit space S1 until the doors are locked is set to t2 (>t1) as defined by the solid line in the right diagram.

In step S164 of FIG. 4, the relative movement calculator 25 receives the position, vehicle speed, and traveling direction of the subject vehicle V before and after the subject vehicle V stops at the target stop position from the vehicle position detector 12 and receives the position, moving speed, and moving direction of the remote operation device 28 before and after the subject vehicle V stops at the target stop position from the position detector 14 for the remote operation device 28. In addition, the relative movement calculator 25 calculates the moving direction of the subject vehicle V and the moving direction of the remote operation device 28 and determines whether the subject vehicle V is traveling in the direction away from the remote operation device 28 or the remote operation device 28 is moving in the direction away from the subject vehicle V before and after the subject vehicle V stops at the target stop position. Then, the control map illustrated in FIG. 6B is applied as substitute for the control maps illustrated in FIGS. 5A and 5B, and in step S167, the locking time setting device 22 sets the time t from when the subject vehicle V stops at the parking space PS1 until the doors are locked, on the basis of the time t-distance L control line illustrated in FIG. 6B and outputs the time t to the locking/unlocking controller 23. In step S168, the locking/unlocking controller 23 controls the locking/unlocking device 27 to lock the doors when the time t has elapsed. This situation is illustrated in FIG. 10.

Figure 10:
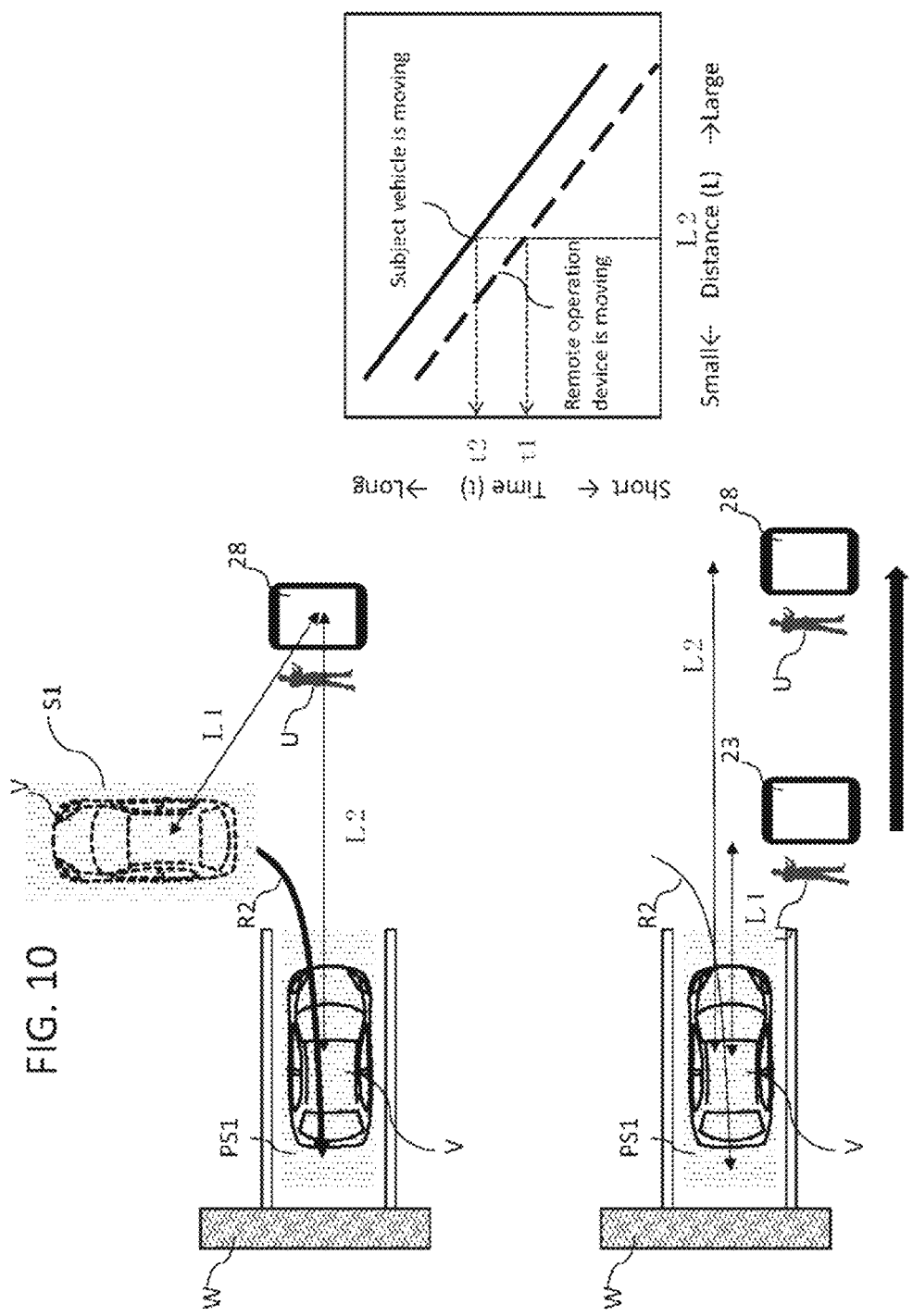
FIG. 10 is a plan view illustrating an example of a scene to which the control map illustrated in FIG. 6B is applied.

FIG. 10 is a set of diagrams illustrating an example of scenes to which the control map illustrated in FIG. 6B is applied. FIG. 10 illustrates a plan view of the scene (upper left diagram) in which the subject vehicle V is entering the parking space in the autonomous entry mode, a plan view of the scene (lower left diagram) in which the operator leaves the parking space after the subject vehicle V enters the parking space in the autonomous entry mode, and the applied control map (in FIG. 10, the control map of FIG. 6B is exemplified in the right diagram). As illustrated in the upper left diagram of FIG. 10, until the subject vehicle V arrives and stops at the parking space PS1, which is the target stop position, in the autonomous entry mode, the distance between the subject vehicle V and the remote operation device 28 is between L1 and L2, and the distance comes to L2 when the subject vehicle V stops, but the position of the remote operation device 28, or the operator U, may not change. When only the subject vehicle V moves away from the operator U, the time from when the subject vehicle V stops at the parking space PS1 until the doors are locked is set to t2 as defined by the solid line in the right diagram. On the other hand, as illustrated in the lower left diagram of FIG. 10, when the remote operation device 28, or the operator U, moves in the direction away from the parking space PS1 (when the distance between the subject vehicle V and the remote operation device 28 is changed from L1 to L2) after the subject vehicle V arrives and stops at the parking space PS1, which is the target stop position, in the autonomous entry mode, the time from when the subject vehicle V stops at the parking space PS1 until the doors are locked is set to t1 (<t2) as defined by the dotted line in the right diagram.

In step S165 of FIG. 4, the moving object detector 24 receives the position of an object from the object detector 13 at predetermined time intervals. When the position of the object changes with time, the moving object detector 24 determines that the object is a moving object, and outputs the presence of the moving object to the locking time setting device 22. Then, the control map illustrated in FIG. 6C is applied as substitute for the control maps illustrated in FIGS. 5A and 5B, and in step S167, the locking time setting device 22 sets the time t from when the subject vehicle V stops at the parking space PS1 until the doors are locked, on the basis of the time t-distance L control line illustrated in FIG. 6C and outputs the time t to the locking/unlocking controller 23. In step S168, the locking/unlocking controller 23 controls the locking/unlocking device 27 to lock the doors when the time t has elapsed.

FIG. 11 is a set of diagrams illustrating an example of scenes to which the control map illustrated in FIG. 6C is applied. FIG. 9 illustrates a plan view of the scene (upper left diagram) in which the subject vehicle V enters the parking space and stops there in the autonomous entry mode, a plan view of the scene (lower left diagram) in which a person U1 is present around the subject vehicle V when the subject vehicle V enters the parking space and stops there in the autonomous entry mode, and the applied control map (in FIG. 11, the control map of FIG. 6C is exemplified in the right diagram). As illustrated in the upper left diagram of FIG. 11, in the scene in which the subject vehicle V arrives and stops at the parking space PS1, which is the target stop position, in the autonomous entry mode, the distance between the subject vehicle V and the remote operation device 28 is L, but when no moving object is present around the subject vehicle V, the time from when the subject vehicle V stops at the parking space PS1 until the doors are locked is set to t2 as defined by the solid line in the right diagram. On the other hand, as illustrated in the lower left diagram of FIG. 11, in the scene in which the subject vehicle V arrives and stops at the parking space PS1, which is the target stop position, in the autonomous entry mode, when the person U1 is present around the subject vehicle V, the time from when the subject vehicle V stops at the parking space PS1 until the doors are locked is set to t1 (<t2) as defined by the dotted line in the right diagram.

In step S166 of FIG. 4, the stop history accumulator 26 outputs, to the locking time setting device 22, the number of times of stops as to how many times the target stop position selected by the target parking space setting device 11 in the present autonomous travel control is accumulated in the stop history accumulator 26. Then, the control map illustrated in FIG. 6D is applied as substitute for the control maps illustrated in FIGS. 5A and 5B, and in step S167, the locking time setting device 22 sets the time t from when the subject vehicle V stops at the parking space PS1 until the doors are locked, on the basis of the time t-distance L control line illustrated in FIG. 6D and outputs the time t to the locking/unlocking controller 23. In step S168, the locking/unlocking controller 23 controls the locking/unlocking device 27 to lock the doors when the time t has elapsed. That is, the time t from when the subject vehicle V stops at the parking space PS1 until the doors are locked is set longer as the number of times in histories of stopping at the target stop position is larger.

As described above, according to the remote parking system 1 of one or more embodiments of the present invention, when the subject vehicle V is executing the autonomous travel control, the automatic locking/unlocking function is prohibited from locking the locking/unlocking device 27 for the doors, and the remote operation can be continued, while on the other hand, the automatic locking time t from when the subject vehicle V stops at the target stop position is set to a time in accordance with the distance L between the subject vehicle V and the remote operation device 28, and the doors can therefore be automatically locked at the timing in accordance with the situation.

According to the remote parking system 1 of one or more embodiments of the present invention, the time t is set relatively longer as the distance L between the subject vehicle V and the remote operation device 28 calculated by the distance calculator 21 is shorter; therefore, the timing of locking the doors by the locking/unlocking device 27 can be set to timing in accordance with the situation, and it is possible to prevent the operator U from being bothered by unlocking the doors of the subject vehicle V using a remote control key or the like.

According to the remote parking system 1 of one or more embodiments of the present invention, in the case of the autonomous exit mode, the time t to the distance L is set relatively longer than that in the autonomous entry mode, so that the timing of locking the doors by the locking/unlocking device 27 can be set to timing in accordance with the situation, and it is possible to prevent the operator U from being bothered by unlocking the doors of the subject vehicle V using a remote control key or the like. Moreover, in the case of the autonomous entry mode, the timing of locking the doors can be shortened thereby to prevent a third person from getting on the subject vehicle V.

According to the remote parking system 1 of one or more embodiments of the present invention, when the subject vehicle V is traveling in the direction away from the remote operation device 28, the time t (temporal interval) is set relatively longer than that when the remote operation device 28 is moving in the direction away from the subject vehicle V even when the distance L between the subject vehicle V and the remote operation device 28 is the same, so that the timing of locking the doors by the locking/unlocking device 27 can be set to timing in accordance with the situation, and it is possible to prevent the operator U from being bothered by unlocking the doors of the subject vehicle V using a remote control key or the like. Moreover, when the remote operation device 28 is moving in the direction away from the subject vehicle V, the timing of locking the doors can be shortened thereby to prevent a third person from getting on the subject vehicle V.

According to the remote parking system 1 of one or more embodiments of the present invention, when a moving object such as a person is present around the subject vehicle V, the time t (temporal interval) is set relatively shorter than that when no moving object is present even when the distance L between the subject vehicle V and the remote operation device 28 is the same, and it is thereby possible to prevent a third person from getting on the subject vehicle V.

According to the remote parking system 1 of one or more embodiments of the present invention, the time t (temporal interval) is set relatively longer as the number of times in histories of stopping at the target stop position is larger even when the distance L between the subject vehicle V and the remote operation device 28 is the same, so that the timing of locking the doors by the locking/unlocking device 27 can be set to timing in accordance with the situation, and it is possible to prevent the operator U from being bothered by unlocking the doors of the subject vehicle V using a remote control key or the like. Moreover, when the operator U is unfamiliar with the surrounding environment, such as when the vehicle is stopped at the target stop position for the first time, the timing of locking the doors can be shortened thereby to prevent a third person from getting on the subject vehicle V.

The above steering angle controller 19 and vehicle speed controller 20 correspond to the travel controller according to the present invention, the above target parking space setting device 11, parking route generator 15, route following controller 17, and target vehicle speed generator 18 correspond to the controller according to the present invention, and the above vehicle position detector 12, position detector 14 for the remote operation device 28, and distance calculator 21 correspond to the distance detector according to the present invention.

DESCRIPTION OF REFERENCE NUMERALS

1 Remote parking system
11 Target parking space setting device
12 Vehicle position detector
13 Object detector
14 Position detector for remote operation device
15 Parking route generator
16 Object deceleration calculator
17 Route following controller
18 Target vehicle speed generator
19 Steering angle controller
20 Vehicle speed controller
21 Distance calculator
22 Locking time setting device
23 Locking/unlocking controller
24 Moving object detector
25 Relative movement calculator
26 Stop history accumulator
27 Locking/unlocking device
28 Remote operation device
281 Antenna
29 Antenna
V Subject vehicle
V1 to V4 Other vehicles
AC1 Read authentication code
PS1, PS2, PS3 Parking space
S1 Exit space
U Operator
W Obstacle (object)
R1, R2 Parking route
L, L1, L2 Distance
t, t1, t2 Time (temporal interval)

The invention claimed is:

1. A vehicle travel control method for performing autonomous travel control of a vehicle to a target stop position on a basis of a remote operation command from a remote operation device located outside the vehicle, the vehicle having an autonomous travel control function and an automatic locking/unlocking function for a door of the vehicle, the autonomous travel control being executed under a precondition that a locking/unlocking device for the door is unlocked, the vehicle travel control method comprising:
   prohibiting the automatic locking/unlocking function from locking the locking/unlocking device for the door while the vehicle is executing the autonomous travel control;
   detecting a distance between the vehicle and the remote operation device when the vehicle stops at the target stop position;
   setting a temporal interval from when the vehicle stops until the locking/unlocking device for the door is locked using the automatic locking/unlocking function to a temporal interval in accordance with the distance; and
   locking the locking/unlocking device for the door using the automatic locking/unlocking function when the temporal interval has elapsed.

2. The vehicle travel control method according to claim 1, comprising
   setting the temporal interval relatively longer as the distance is shorter.

3. The vehicle travel control method according to claim 2, comprising,
   in the autonomous travel control in which the vehicle parked is controlled to exit to the target stop position, setting the temporal interval relatively longer than that in the autonomous travel control in which the vehicle is controlled to enter the target stop position.

4. The vehicle travel control method according to claim 2, comprising:
   detecting a position, a vehicle speed, and a traveling direction of the vehicle;
   detecting a position, a moving speed, and a moving direction of the remote operation device;
   determining whether the vehicle is traveling in a direction away from the remote operation device or the remote operation device is moving in a direction away from the vehicle; and
   when the vehicle is traveling in the direction away from the remote operation device, setting the temporal interval relatively longer than that when the remote operation device is moving in the direction away from the vehicle.

5. The vehicle travel control method according to claim 2, comprising:
   detecting whether or not a moving object is present around the vehicle; and
   when the moving object is present, setting the temporal interval relatively shorter than that when the moving object is not present.

6. The vehicle travel control method according to claim 2, comprising:
- accumulating history information of stopping at the target stop position; and
- setting the temporal interval relatively longer as the number of times in histories of stopping at the target stop position is larger.

7. A vehicle travel control apparatus comprising:
- a travel controller configured to perform autonomous travel control of a vehicle having an autonomous travel control function;
- a controller configured to calculate a route from a current position to a target stop position and output a travel command to the travel controller;
- a locking/unlocking controller configured to perform automatic locking/unlocking control of a locking/unlocking device for a door of the vehicle;
- a remote operation device configured to command to execute or stop the controller from outside of the vehicle;
- a distance detector configured to detect a distance between the vehicle and the remote operation device when the vehicle stops at the target stop position; and
- a locking time setting device configured to set a temporal interval from when the vehicle stops until the locking/unlocking device for the door is locked to a temporal interval in accordance with the distance, the locking/unlocking controller operating to:
- prohibit locking of the locking/unlocking device for the door while the vehicle is executing the autonomous travel control; and
- lock the locking/unlocking device for the door when the temporal interval set by the locking time setting device has elapsed.

\* \* \* \* \*